April 2, 1940.                G. CUNNINGHAM                2,195,694
                           RULE AND STRAIGHTEDGE
                            Filed May 2, 1938

Grant Cunningham
INVENTOR

BY Victor J. Evans & Co.
ATTORNEYS

Patented Apr. 2, 1940

2,195,694

UNITED STATES PATENT OFFICE 2,195,694

RULE AND STRAIGHTEDGE

Grant Cunningham, Maspeth, Long Island, N. Y.

Application May 2, 1938, Serial No. 205,619

4 Claims. (Cl. 33—76)

This invention relates to a combined rule and straightedge for aiding in drawing plans or sketches and has for the primary object the provision of an efficient and inexpensive device of this character which may be easily and quickly clipped on a pad, tablet or the like for providing thereto a straight edge having a graduated scale to aid a person in the making of drawings of different scales and eliminates the use of a T square and drawing board and also may be employed as an ordinary rule for making measurements.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a top plan view illustrating a combined rule and straightedge constructed in accordance with my invention.

Figure 3 is a top plan view showing the device removed from a pad or the like.

Figure 1:
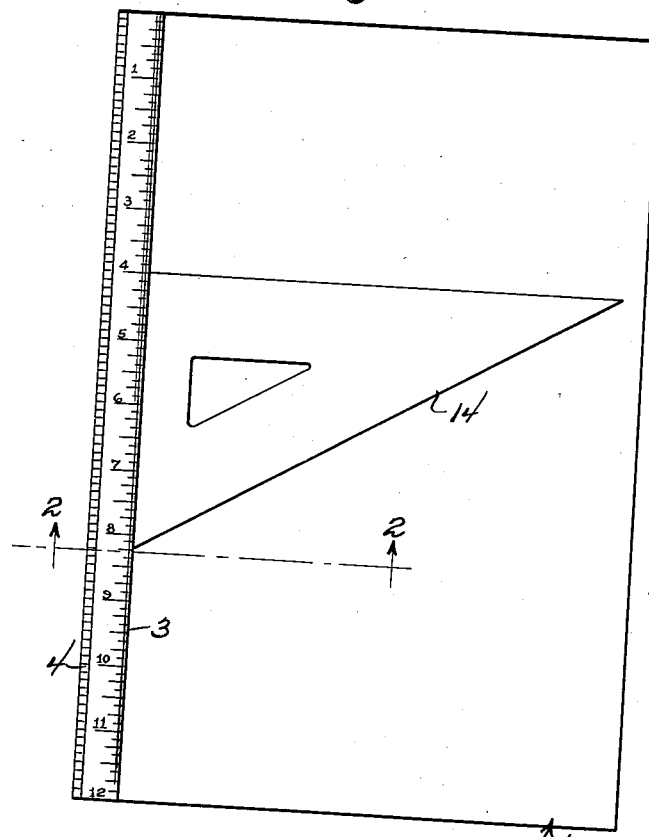
Figure 3:
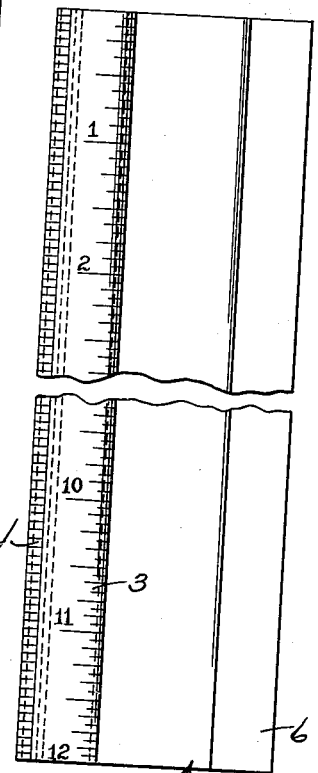

Referring in detail to the drawing, the numeral 1 indicates a pad of a conventional construction consisting of a series of superimposed leaves or sheets of paper mounted on a backing 2. The present invention may be readily adapted to a pad of the character described by clipping the present invention onto the backing 2, as shown in Figure 2, or if desired the present invention may be clipped onto a series of sheets of paper.

Figure 2:
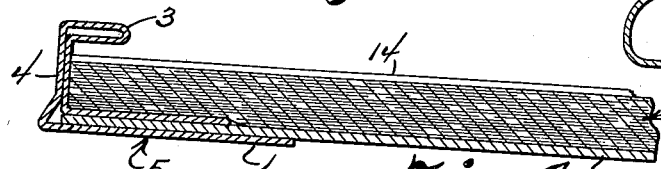
Figure 2 is a sectional view taken on line 2—2 of Figure 1, showing the present invention adapted on a pad.

With the invention adapted to the pad, as shown in Figures 1 and 2, an efficient straight-edge device is provided whereby sketches or plans may be drawn to a selected scale on the uppermost sheet, eliminating the use of a T-square and a drafting board. The straight edge device may be used in conjunction with a triangle, as shown in Figure 1.

The invention in the preferred form thereof consists of a scale bearing member 3 integral with and preferably turned inwardly from a straightedge member 4. Integral with the member 4 is a spring clip 5 including resilient jaw portions 6 one of a greater width than the other, as shown in Figure 2. The jaw portions may be readily engaged over one edge of the backing 2 to firmly secure the straightedge member against one side of the pad with the graduated bearing member 3 disposed over the pad and spaced from the uppermost sheet thereof. A triangle 14 or similar drafting tool then may be used on the uppermost sheet in abutting relation to the straightedge member 4 and worked in conjunction with the scale on the member 3 for drawing plans or sketches on the uppermost sheet to a selected scale. The members 3, 4 and 5 as shown are constructed from a single elongated strip of sheet of material which is first bent transversely upon itself to form the member 3 with double walls spaced apart, and then bent to form the member 4 of a double wall construction, the member 3 also being of a double wall construction to give rigidity and strength to the device. After the formation of the member 4 the clip 5 consisting of the jaw members 6 is formed. The walls of the member 4 as shown contact each other throughout the major portion thereof, but the outer wall is offset from the other wall where the clip forms onto the member 4 with a beveled effect. Instead of applying clip 5 onto the tablet or pad backing 2 it may be adapted to several unattached sheets of paper arranged in superimposed relation. When the device is applied to a pad as shown in Figure 2, and it is desired to use a larger sheet of paper than afforded by the pad, a large sheet may be folded upon itself and arranged on the pad against the straight wall member and the sketches or plans made thereon.

The outer wall of the member 4 has graduations on its outer face in the region of its beveled offset to provide a rule capable of being used in an ordinary manner for making measurements.

Figure 5:
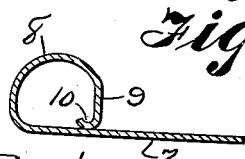
Figure 5 is a fragmentary transverse sectional view illustrating a modified form of my invention.
Figure 4:
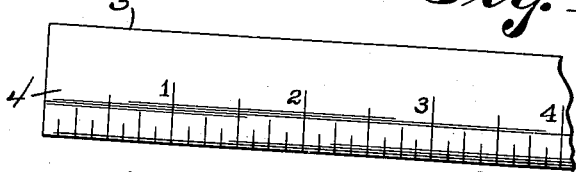
Figure 4 is a fragmentary side elevation showing a graduated scale to permit the device to be employed as an ordinary rule.

Referring to the modified form of my invention as shown in Figure 5, the device may consist of a plate-like portion 7 having integral with one edge a semi-cylindrical portion 8, the wall of which is disposed straight and at right angles to the plate 7 to form a straightedge 9. The semi-cylindrical portion after the formation of the straightedge 9 is curved inwardly, as shown at 10, to cooperate with the plate 7 in forming a clamp or clip adapted to receive therebetween and grip the backing of the pad. The straightedge 9 has graduations thereon.

Figure 6:
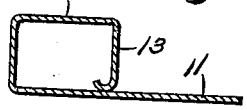
Figure 6 is a view similar to Figure 5 showing another modified form of the invention.

Referring to my modified form of invention, as shown in Figure 6, a plate 11 is employed similar in construction to plate 7 and has integral therewith a substantially rectangular shaped member 12 in cross section providing a straight edge 13 on which graduations are applied and the free edge of the member 12 is curved to cooperate with the plate 11 in forming a clip.

Figure 7:
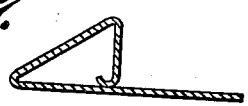
Figure 7 is a view similar to Figure 6 showing still another modified form of my invention.

Referring to my modified form of invention, as shown in Figure 7, the only difference from what is shown in Figures 5 and 6 is that the straightedge forming member is of substantially triangular shape in cross section.

What is claimed is:

1. An integral unitary straightedge and ruler device comprising a horizontal parallel pair of elongated rectangular resilient clip members, an elongated vertical flat faced straightedge member supportingly adjoined at its lower longitudinal margin to the outer longitudinal margins of said clip members, and a longitudinal scale-bearing member extending horizontally inward from the top margin of said straightedge member and overhanging the upper clip member in spaced relation thereto.

2. An integral unitary straightedge and ruler device comprising a horizontal parallel pair of elongated rectangular resilient clip members, an elongated vertical flat faced straightedge member supportingly adjoined at its lower longitudinal margin to the outer longitudinal margins of said clip members, a longitudinal scale-bearing member extending horizontally inward from the top margin of said straightedge member and overhanging the upper clip member in spaced relation thereto, and an outwardly offset ruler portion extending longitudinally of the device with a beveled outer face extending at a downward and outward inclination from the lower portion of said straightedge member with its lower edge substantially coincident with the plane of the bottom face of the lower clip member.

3. An integral straightedge and ruler device comprising a single elongated strip of inherently resilient but form retentive sheet material bent and rebent to form and locate its two longitudinal portions, of substantial width, in parallel relation to each other and constituting a horizontal resilient paper receiving and clamping clip, the lower member of the clip extending beyond the longitudinal margin of the upper member thereof, the two body portions of the sheet next adjacent said clip portions being turned at right angles thereto in close lapped relation and providing a vertical double walled straightedge member extending above the clip portion of the device at the rear thereof, and the rest of the intermediate body portion of the sheet being folded upon itself in spaced overlapping relation and providing a double walled inturned horizontal scale-bearing member extending lengthwise of the upper edge portion of said straightedge member and overhanging the clip portion in spaced relation thereto.

4. The herein described straightedge and ruler device comprising a single elongated strip of sheet metal folded upon itself transversely along a longitudinal line intermediate its opposite marginal portions, thus providing an inturned flat horizontal overhanging double walled member, thence bent downwardly at right angles to said overhanging member and providing overlapping portions constituting a vertical double walled straight edge member, the rest of the inner sheet portion being rebent inwardly at right angles to the base of said straightedge member and providing an upper horizontal clip member and the rest of the outer sheet portion being bent first obliquely outward from the lower portion of the straightedge member and thence rebent horizontally inward and providing a companion clip member cooperatively below the upper clip member, said lower member extending beyond the inner longitudinal margin of the upper member.

GRANT CUNNINGHAM.